US012361392B2

(12) United States Patent
Lau

(10) Patent No.: US 12,361,392 B2
(45) Date of Patent: Jul. 15, 2025

(54) ASSOCIATING PAYMENT INFORMATION WITH A DOCUMENT SEPARATE THEREFROM FOR USE OF AN ONLINE PAYMENT SERVICE

(71) Applicant: KYOCERA Document Solutions Inc., Osaka (JP)

(72) Inventor: Zheila Ola Lau, San Ramon, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 302 days.

(21) Appl. No.: 17/959,208

(22) Filed: Oct. 3, 2022

(65) Prior Publication Data

US 2024/0112153 A1    Apr. 4, 2024

(51) Int. Cl.
*G06Q 20/00*    (2012.01)
*G06F 16/383*    (2019.01)
*G06Q 20/04*    (2012.01)
*G06Q 20/38*    (2012.01)
*G06V 30/262*    (2022.01)

(52) U.S. Cl.
CPC ......... *G06Q 20/047* (2020.05); *G06F 16/383* (2019.01); *G06Q 20/389* (2013.01); *G06V 30/274* (2022.01)

(58) Field of Classification Search
CPC .... G06Q 20/047; G06Q 20/389; G06Q 40/12; G06V 30/274
USPC .......................................................... 705/24
See application file for complete search history.

(56) References Cited

U.S. PATENT DOCUMENTS

| | | | |
|---|---|---|---|
| 10,410,016 B1 * | 9/2019 | Damick | H04L 63/10 |
| 2006/0015811 A1 | 1/2006 | Tanaka et al. | |
| 2011/0247081 A1 * | 10/2011 | Shelton | G06F 21/6209 726/28 |
| 2021/0117562 A1 * | 4/2021 | Balan | G06F 21/10 |

* cited by examiner

*Primary Examiner* — Rokib Masud
(74) *Attorney, Agent, or Firm* — W. Eric Webostad

(57) ABSTRACT

Systems and methods relate generally to associating an online financial service with a receipt are disclosed. In one such method, a login session is established with a programmed server. The receipt is uploaded to the programmed server. The receipt is indexed and timestamped by the programmed server with at least one search tag in association therewith. Financial information is extracted from the receipt with optical character recognition. The receipt is annotated with a note having payment information for a payment service of the online financial service. The note is stored in association with the receipt though separate from the receipt.

20 Claims, 12 Drawing Sheets

ASSOCIATING PAYMENT INFORMATION WITH A DOCUMENT SEPARATE THEREFROM FOR USE OF AN ONLINE PAYMENT SERVICE

FIELD

The following description relates to protecting information. More particularly, the following description relates to associating payment information with a document separate therefrom for use of an online payment service.

BACKGROUND

Conventionally, in a workplace, reimbursement of an expense may involve sending an expense report with copies of receipts via email, along with banking information on where to send a wire payment. Such banking information may include one or more routing numbers, a bank account, and account holder information The current process has some security and identify theft risks and does not offer much flexibility in terms of who or where payment can be made. Financial services and institutions have introduced linking bank accounts to their payment service account. Using these payment services, a user may only need to share either their email address, phone number or account ID. This allows anonymity of bank account numbers thus lowering potential risks, because bank account and account holder information are not shared.

SUMMARY

In accordance with one or more below described examples, a method relating generally to associating an online financial service with a receipt is disclosed. In such a method, a login session is established with a programmed server. The receipt is uploaded to the programmed server. The receipt is indexed and timestamped by the programmed server with at least one search tag in association therewith. Financial information is extracted from the receipt with optical character recognition. The receipt is annotated with a note having payment information for a payment service of the online financial service. The note is stored in association with the receipt though separate from the receipt.

In accordance with one or more below described examples, a system relating generally to associating an online financial service with a receipt is disclosed. In such a system, a host computational device has a memory configured to store program code. A processor is coupled to the memory. In combination and response to executing the program code, the host computational device is configured to initiate operations for implementing a process for the associating an online financial service with a receipt. The process includes: a login session is established with a programmed server; the receipt is uploaded to the programmed server; the receipt is indexed and timestamped by the programmed server with at least one search tag in association therewith; financial information is extracted from the receipt with optical character recognition; the receipt is annotated with a note having payment information for a payment service of the online financial service; and the note is stored in association with the receipt though separate from the receipt.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 3-1 is a flow diagram depicting an example of an upload flow for a mobile client.

FIG. 3-2 is a flow diagram depicting an example of a document server file annotation flow.

FIG. 3-3 is a flow diagram depicting an example of a note index flow 310.

FIG. 3-4 is a flow diagram depicting an example of a note properties flow.

FIG. 3-5 is a flow diagram depicting an example of a payment process flow.

FIG. 3-6 is a flow diagram depicting an example of an unauthorized user permission request flow.

FIG. 4 is a pictorial diagram depicting an example of a network.

FIG. 5 is block diagram depicting an example of a portable communication device.

FIG. 6 is a block diagram depicting an example of a multi-function printer (MFP).

DETAILED DESCRIPTION

Figure 1:
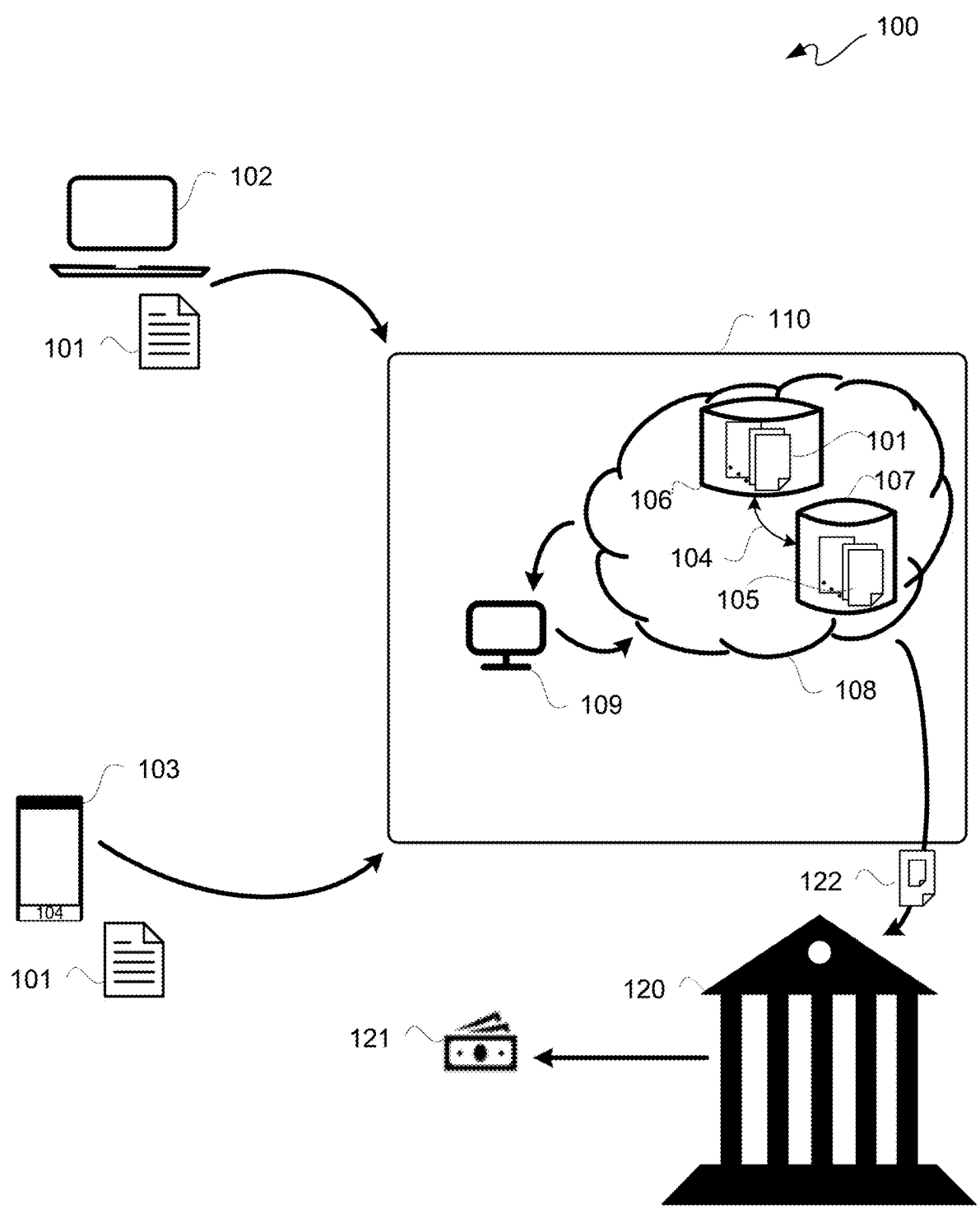
FIG. 1 is a pictorial-flow diagram depicting an example of a reimbursement system for associating confidential information with a reimbursement document, which may include one or more receipts, separate therefrom for protection of such confidential information.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

In a workplace, the reimbursement of an expense may have this workflow: send an expense report and one or more associated receipts via email; send bank information to where the payment will be sent (usually includes routing number, bank account number, and account holder and bank branch information. This conventional process has some security and identify theft risks, and does not offer much flexibility in terms of who or where payment can be made. Online financial services and institutions have introduced payment methods wherein a user can link bank accounts to their payment service account. Using these payment services, a user only need to share either their email address, phone number or account identifier. This allows anonymity of bank account numbers thus lowering potential risks since bank account and account holder information are not shared. Payment service providers, such as for example PayPal, Venmo, Zelle, and others, may link a credit card or a bank account to a user's account with such payment service.

As described below in additional detain, a payment service of an online financial service may be utilized with a document server to retrieve payment account information from an annotation or note, such as an electronic "sticky note" added to an uploaded document. With the above general understanding borne in mind, various configurations for systems, and methods therefor, for associating payment information with a document separate therefrom are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a pictorial-flow diagram depicting an example of a reimbursement system 100 for associating confidential information with a reimbursement document, which may include one or more receipts, separate therefrom for protection of such confidential information. In reimbursement system 100, a reimbursement document 101 may be uploaded from a computing device, such as a notebook computer, a desktop computer, a tablet, a smart phone or other electronic computing device 102 or 103 to a cloud-based server system 110. For purposes of clarity by way of example and not limitation, it is assumed that a reimbursement document is a single receipt. However, in another example a reimbursement document may be a plurality of receipts and may or may not include a reimbursement form.

Cloud-based server system 110 may include a programmed server, such as a programmed reimbursement document server 109. For example, programmed reimbursement document server 109 may be configured as a cloud information manager, such as for example with a Kyocera Cloud Information Manager or other manager software system.

An uploaded reimbursement document 101 to cloud-based server system 110 may be sent without any confidential information in one or more confidential information fields, such as for example a field for a bank account number or other payment information. Reimbursement document 101 may be linked 104 with at least one annotated note 105. Such linking 104 may be between a reimbursement documents database 106 and an annotations/notes database 107 of a cloud-based database subsystem 108, as described below in additional detail.

Data in annotations/notes database 107 may be stored in encrypted form. However, reimbursement documents in reimbursement documents database 106 may not need to be encrypted as they need not contain any confidential information. From a security standpoint, this allows the amount of information to be protected from risk of hacking or unlawful access to be reduced, as only notes and not notes plus reimbursement documents may need to be protected with encryption. Along those lines, annotations/notes database 107 may be configured for a general data protection regulation, whereas reimbursement documents database 106 may avoid such regulation.

Cloud-based server system 110 may be in communication with a payment service 120. A note 104 may be linked with a reimbursement document 101 and such linked combination may be sent to a payment service 120. In this example, a bank online payment service is illustratively depicted; however, another type of payment service may be used in other examples. Other examples of payment services may include Paypal, Venmo, and Zelle, among others.

Payment service 120 may authorize such transaction and make a payment 121 using such note 104 linked with a reimbursement document 101, namely instruction 122. Such payment 121 may be a wire transfer, a printed check mailed through a postal system, a vendor direct payment, or other form of payment.

Figure 2:
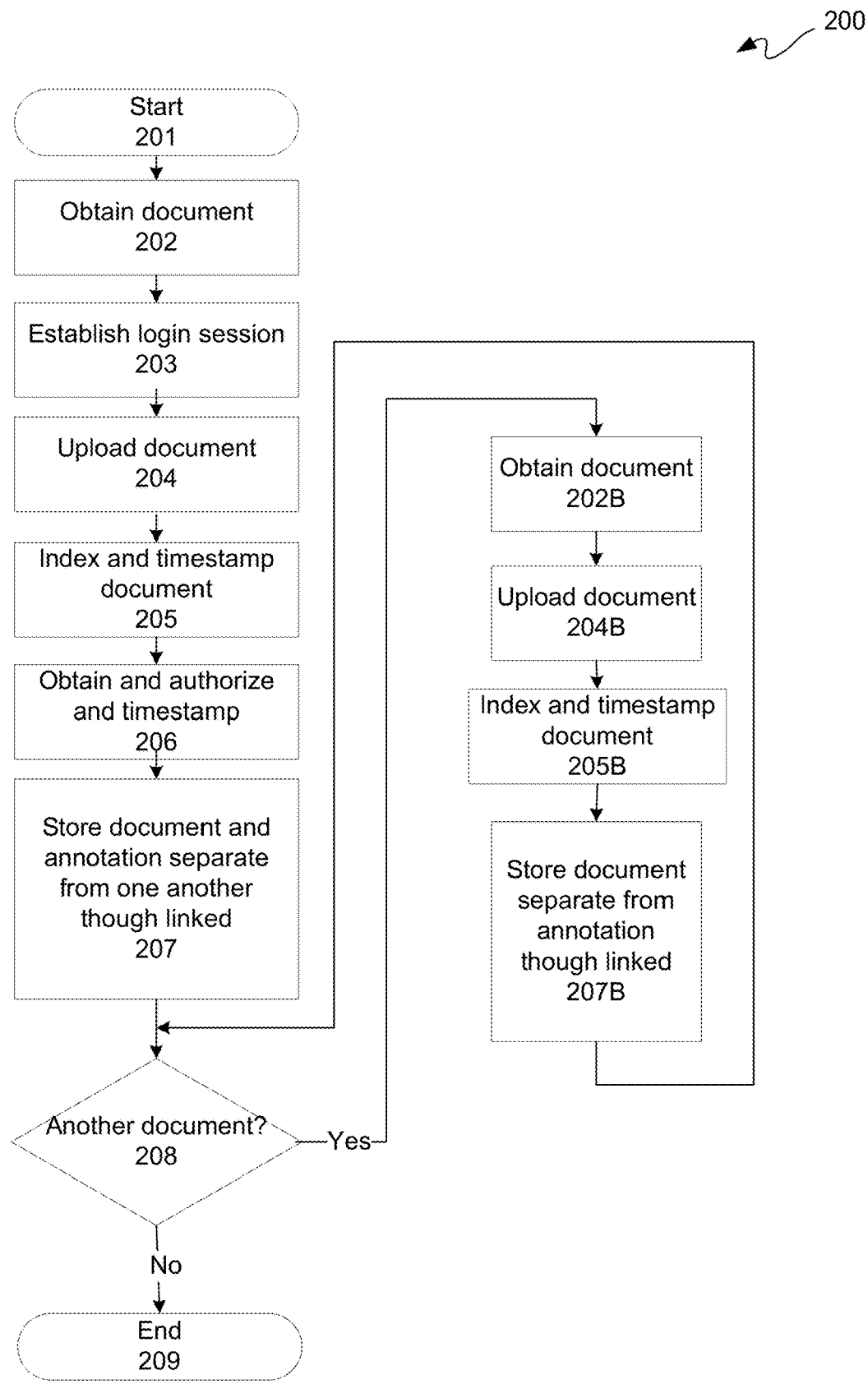
FIG. 2 is a flow diagram depicting an example of a reimbursement document-to-annotation association flow ("association flow").

FIG. 2 is a flow diagram depicting an example of a reimbursement document-to-annotation association flow ("association flow") 200. Association flow 200 may be for associating confidential information in an annotation or note with a reimbursement document separate therefrom. Association flow 200 is further described with simultaneous reference to FIGS. 1 and 2.

At operation 201, annotation flow 200 may be initiated or started such as by an electronic computing device 102 or 103. For purpose of clarity by way of example and not limitation, an electronic computing device 103 ("mobile device 103") is assumed though a stationary computer, including without limitation a docked notebook computer, may be used in another example. Generally, it shall be assumed that mobile device 103 is a cellular or satellite smart phone.

At operation 202, a reimbursement document may be obtained. This reimbursement document, which may be a form letter or a form, may have one or more fields or blank spaces for input of confidential payee information, though such reimbursement document need not contain any confidential information at this point in annotation flow 200. Along those lines, a reimbursement document obtained at operation 202 may be without any confidential information therefor. For example, a reimbursement document 101 without any confidential information may be obtained by a mobile device 103 from the Internet, and then sent to a programmed server of cloud-based server system 110.

At operation 203, a login session may be established with a programmed server 109. For example, a login session may be established with a programmed reimbursement document server 109 of cloud-based server system by a mobile device 103 programmed with a client application 104, generally depicted.

At operation 204, a reimbursement document 101 obtained at operation 202 may be uploaded to a programmed server. For example, a reimbursement document 101 may be uploaded from mobile device 103 via client application 104 to programmed reimbursement document server 109. For purposes of clarity by way of example and not limitation, it shall be assumed that uploaded documents are receipts. Such receipts may be uploaded as images, and information from such images, including amounts payable, may be extracted by OCR by a programmed document server.

At operation 205, a programmed reimbursement document server 109 may index an uploaded reimbursement document 101. Indexing an uploaded reimbursement document 101 by programmed reimbursement document server 109 with at least one search tag in association with confidential information may be used for linking reimbursement documents 101 to notes 105. Furthermore, reimbursement documents 101 may be indexed for easy searching in reimbursement documents database 106 in addition to linking specific fields to corresponding data therefor in one or more notes 105 in annotations/notes database 107. Additionally, a user can search for certain tags/fields in a reimbursement document (e.g., a payee tag or field) and do a batch process for associating such a note or annotation to each such field in multiple reimbursement documents. For example each reimbursement document may have a payee name field and a last four of a credit card number field for a note containing fields with corresponding identification information.

Optionally, at operation 205 a reimbursement document 101 may be timestamped by programmed reimbursement document server 109. Such timestamp may be used for identifying a date of creation of such reimbursement document. Furthermore, such timestamp may be used to limit a life cycle or life span of such reimbursement document, including timing and prompting to review such reimbursement document for determining whether to maintain, update or replace such reimbursement document. Moreover, at least one annotation may be timestamped for having a limited life span separate from a life span of a reimbursement document.

At operation 206, at least one annotation 105 for having at least a portion of confidential information for reimbursement document in association therewith may be obtained. For example, a SSN or other confidential information may be obtained as at least one annotation or note 105. At operation 206, as part of such obtaining, a user may in effect or with a separate click to agree to authorize a programmed reimbursement document server 109 to create a link 104 to a selected note 105 obtained from annotations/notes database 107 with a reimbursement document 101 in reimbursement documents database 106. In this example both of databases 106 and 107 are of cloud-based server system 110, though in another example either or both may be remotely located from a cloud 108 of cloud-based server system 110.

Once a reimbursement document 101 has been uploaded or stored in reimbursement documents database 106, a user can annotate such reimbursement document by linking one or more notes 105 to such reimbursement document 101. This linking may be for application of specific confidential information to one or more specific fields for execution of payment for a reimbursement document, such as for example linking a user's SSN to payor name and last four of a credit card fields in a reimbursement document 101. This may generally be thought of as adding or applying a "sticky note" that contains data for confidential information to a reimbursement document, where such "sticky note" may be temporarily located at a location in such reimbursement document for input of such information but also may be subsequently removed from such reimbursement document. Thus, this association between "sticky note" and reimbursement document may be temporary for purposes of display for example but not storage of such reimbursement document.

Along those lines, some generally data protection for purposes of privacy rights may involve removing data, such as when an employee leaves an employer or for other reasons. Rather than having to find and purge all reimbursement documents of such an employee, any and all confidential notes 105 of such employee required to be purged may be purged.

Optionally, at operation 206 a note or annotation 105 may be timestamped by programmed reimbursement document server 109. Such timestamp may be used for identifying a date of creation of such note.

Furthermore, such timestamp may be used to limit a life cycle or life span of such note, including timing and prompting to review such note for determining whether to maintain, update or replace such note. In an example, a user may specify how long a note is "alive". Options may include automatic deletion by date, automatic deletion by state (i.e., delete a note when an associated reimbursement document is done processing within a workflow).

At least one annotation 105 may be timestamped for having a limited life span separate from a life span of an associated reimbursement document. An annotation 105 may have a shorter life span than an associated reimbursement document. This may be used for automatically purging confidential information at the end of a life cycle therefor, such as for example at the end of a project.

Each note 105 may have one or more other properties in addition to a timestamp. For example, an administrator or owner of a note may set a visibility property, such as who can view such a note. Visibility options may include: individual users, groups of users, public (all users), and/or private (only owner). In a programmed reimbursement document server 109, an unauthorized user may see the number of annotations in a reimbursement document and may request view access to of an owner or administrator.

Another property of a note may be type of access should access be granted. For example, an administrator or owner may set access to a note as: read-only access for viewing only, edit access for viewing and modifying only, and edit-delete access for viewing, modifying, and deleting.

An owner or administrator may assign additional security to a note, such as a PIN (personal identification number) or password for access for decryption and access. Such PIN and/or password may be tied to a visibility property, as previously described, to allow for different types of access after entry via PIN or password. A PIN and passwords may include an effective date or date range to limit visibility time frame of a note.

Once a receipt document has been processed, a user can annotate by adding a sticky note to add payment information. When adding a sticky note, user may include one or more of the following forms of information in corresponding fields: a payee identifier with a payment service, such as for example Paypal, Venmo, Zelle, which may include a username, an email, a mobile or other phone number, a QR cord or other information, a business username, a business phone number, a business email, a business QR code, or other identifier information.

Payer may be notified via email or event notification that a request was received to link a note with a receipt. Additionally, an annotation may indicate whether a partial or full amount is to be applied, where a user may specify a partial amount or percentage in a note. An extracted amount from a receipt by OCR may thus be a suggested amount or default amount for full payment. A user who specifies partial reimbursement may invite one or more other users to add more payment information in one or more other sticky notes in instances where there are multiple payees in one receipt.

At operation 207, such at least one annotation for association with such a reimbursement document may be stored separate from such reimbursement document. Links for linking notes and reimbursement documents may be stored to allow an accessed reimbursement document in a database to link to one or more notes in a separate database. Furthermore, stored with such reimbursement documents may be at least one search tag to provide an updated form of such reimbursement documents.

At operation 208, it may be determined whether there is another reimbursement document to process. Operation 208 may be used for batch processing. A user may search for certain tags/fields in receipt documents and use batch processing for adding a sticky note that contains payment info for each of those receipt documents in such batch. Multiple sticky notes can be added to multiple documents as described herein. Moreover, multiple people can be paid from one receipt, as described herein.

At operation 208, a search of reimbursement document database 106 may be performed for at least one search tag corresponding to indexing a reimbursement document at operation 205 for with at least one annotation obtained at 206. For example, if a search is performed to find SSN tags in reimbursement documents for a user, a list of reimbursement documents having SSN tags in reimbursement document database 106 for such user may be retrieve, and a next reimbursement document in such list may be obtained at operation 202B. If there are no other reimbursement documents to process as determined at operation 208, then association flow 200 may exit or end at operation 209.

If, however, at operation 208 there is another reimbursement document to process, then such other reimbursement document may be retrieved at operation 202B, where "B" is to indicate batch processing, such as from reimbursement document database 106. Batch processing a list of reimbursement documents for annotating each of such reimbursement documents with at least one annotation may include performing operations 202B, 204B, 205B, and 207B corresponding to operations 202, 204, 205, and 207, and then returning to operation 208. As batch operation correspond to their non-batch counterparts, repeating description of such operations is avoided for purposes of clarity. Additionally, such batch processing may be performed with the same login session as performed at operation 203 and with the same at least one note obtained, authorized for linking and timestamped at operation 206.

Batch processing may allow for linking of multiple ones of reimbursement documents at least one same annotation. If multiple notes are obtained at operation 206 for a user, then multiple reimbursement documents may be batch processed with multiple notes added to each such reimbursement document of such multiple reimbursement documents. Moreover, notes 105 may be portable. For example, a note may be saved in an owner's account so it can be reused and added to different reimbursement documents easily.

Figures 1, 3:
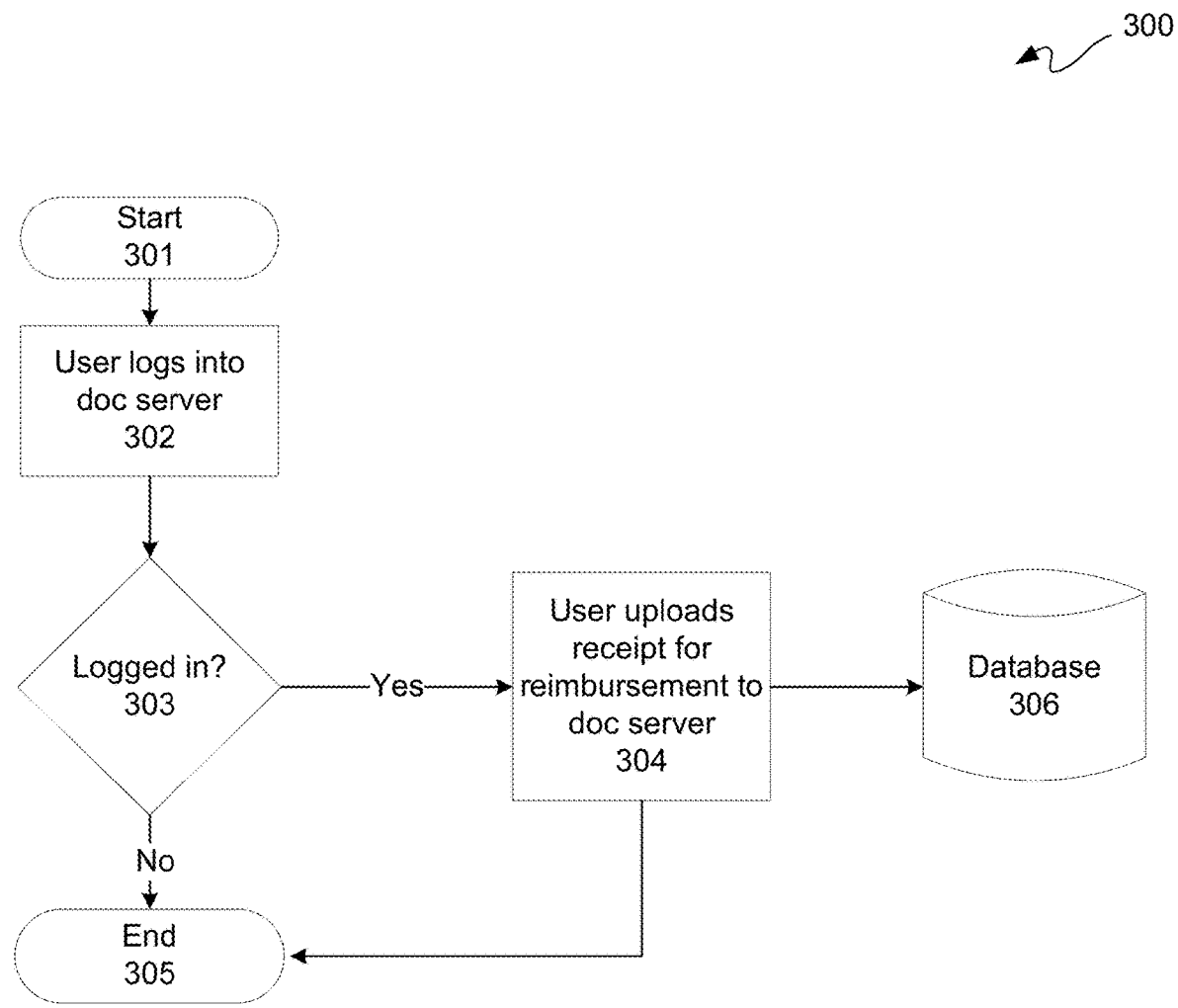
Figures 2, 3:
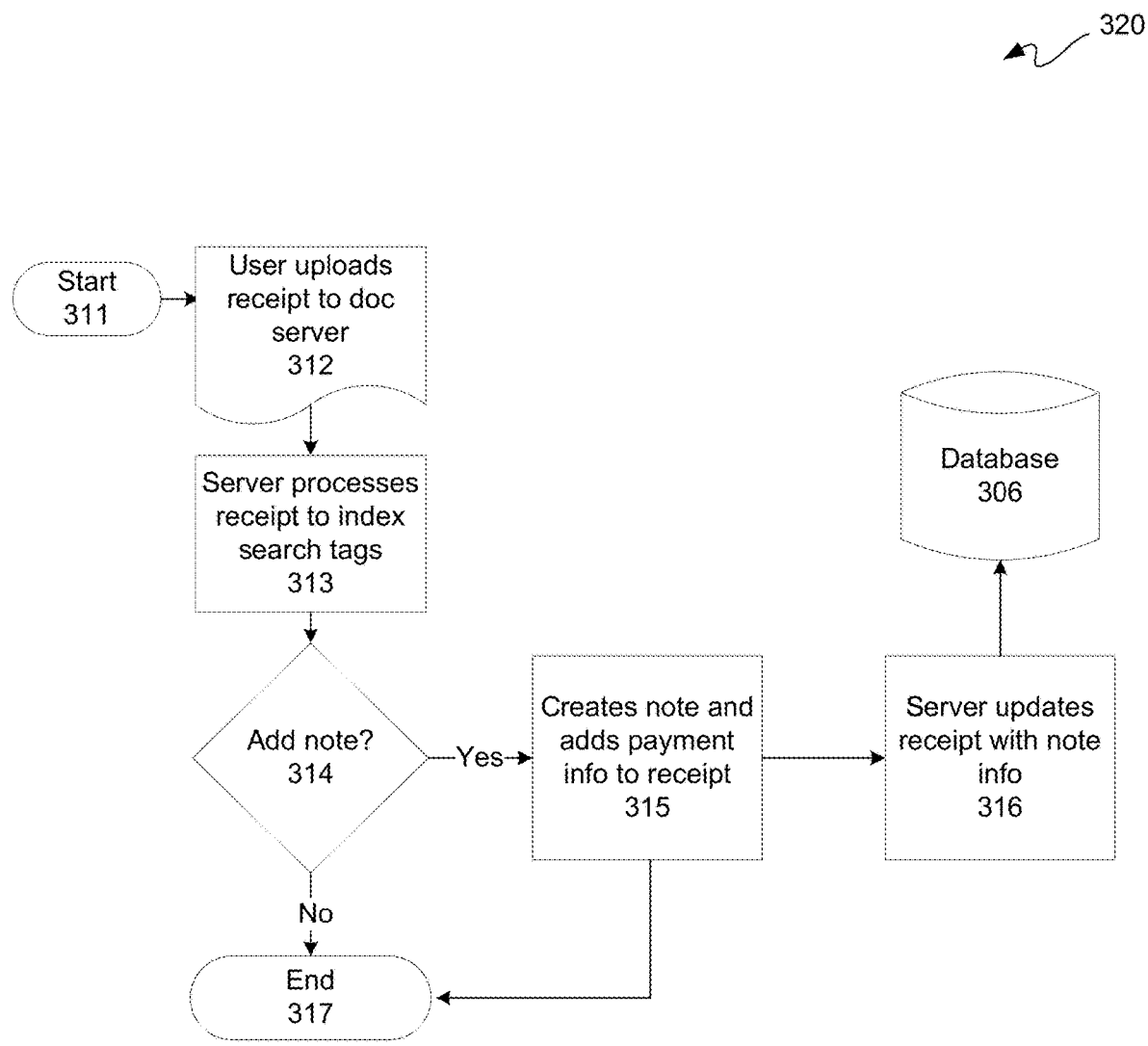
Figure 3:
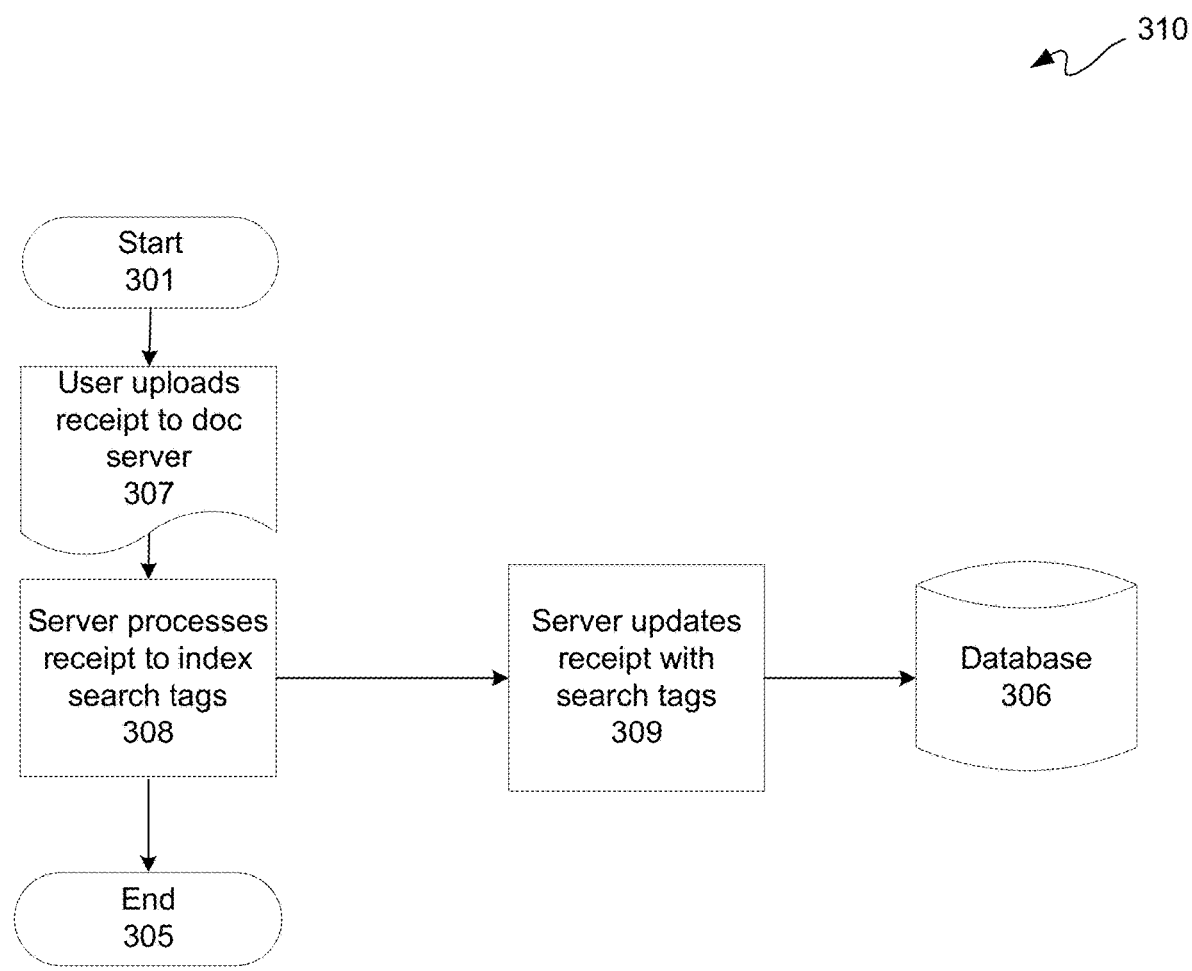

FIG. 3-1 is a flow diagram depicting an example of an upload flow 300 for a mobile client. Upload flow 300 may be used for uploading a document as described above using a mobile device programmed with a mobile client. Such a mobile client may be configured in accordance with the following description. Upload flow 300 is further described with simultaneous reference to FIGS. 1 through 3-1.

At operation 301, upload flow 300 may start. A reimbursement document may be may be uploaded. A reimbursement document may simply be a receipt. In another example, a reimbursement document may be a reimbursement form completed by a user with one or more corresponding receipts. However, for clarity, it shall be assumed that a reimbursement document is a receipt.

At operation 302, a user may log into a document server, such as document server 109. At operation 303, it may be determined a user is logged in. This may involve an authentication of a user. If a user is not authenticated, then upload flow 300 may end at 305.

If, however, at operation 303, a user is log into a programmed reimbursement document server, then at operation 304 a user may upload a reimbursement document, such as for example a receipt, to a programmed reimbursement document server. Such uploaded reimbursement document may be stored at operation 306 in a reimbursement document database 106, as previously described. Furthermore, after uploading at operation 304, upload flow 300 may end at 305 with storing happening such reimbursement document in the background.

FIG. 3-2 is a flow diagram depicting an example of a document server file annotation flow 320. Document server file annotation flow 320 may be used for annotating a reimbursement document with search tags and a note. Document server file annotation flow 320 is further described with simultaneous reference to FIGS. 1 through 3-2.

At operation 311, file annotation flow 320 may start. At operation 312, a user may upload a reimbursement document, such as for example a receipt, to a document server. Such a receipt need not include any confidential information.

At operation 313, a programmed reimbursement document server may be configured to process such uploaded reimbursement document 312 to index same with one or more search tags. At operation 314, it may be determined whether a note is to be associated with or added to such uploaded reimbursement document 312.

If such a note is not to be added as determined at operation 314, then at operation 317 file annotation flow 310 may end. If, however, it is determined at operation 314 a note is to be added to an uploaded reimbursement document 312, then at operation 315 a user may create and add a note to an uploaded reimbursement document 312. Again, such note may be associated with a reimbursement document, such as through a link; however, such a note and a reimbursement document are separately stored, so a note is not a direct part of such reimbursement document.

After creation and addition of a note at operation 315, at operation 316 a programmed reimbursement document server may update an uploaded reimbursement document 312 for association with such a note, such as adding a link. An updated reimbursement document may be stored by programmed reimbursement document server in reimbursement document database 106 at operation 306.

Such uploaded reimbursement document may be stored in a reimbursement document database 106, as previously described. Furthermore, after adding at operation 315, annotation flow 300 may end at operation 317 with server updating and storing at operations 316 and 306 happening in the background.

FIG. 3-3 is a flow diagram depicting an example of a note index flow 310. Note index flow 310 may be used for setting index properties for reimbursement document, such as a receipt for example. Note index flow 310 is further described with simultaneous reference to FIGS. 1 through 3-3.

At operation 301, note index flow 310 may be started. At operation 307, a user may upload a receipt to a document server. Such a receipt 307 may be processed by such a document server at operation 308 to index search tags for such receipt 307.

At operation 309, such a receipt may be updated with search tags by such a document server. At operation 306, such an receipt with updated search tags may be stored in a database. Operations at 309 and 306 may be performed in the background, while note index flow 310 may end at operation 305 after a document server processes such a receipt at operation 308.

Figures 3, 4:
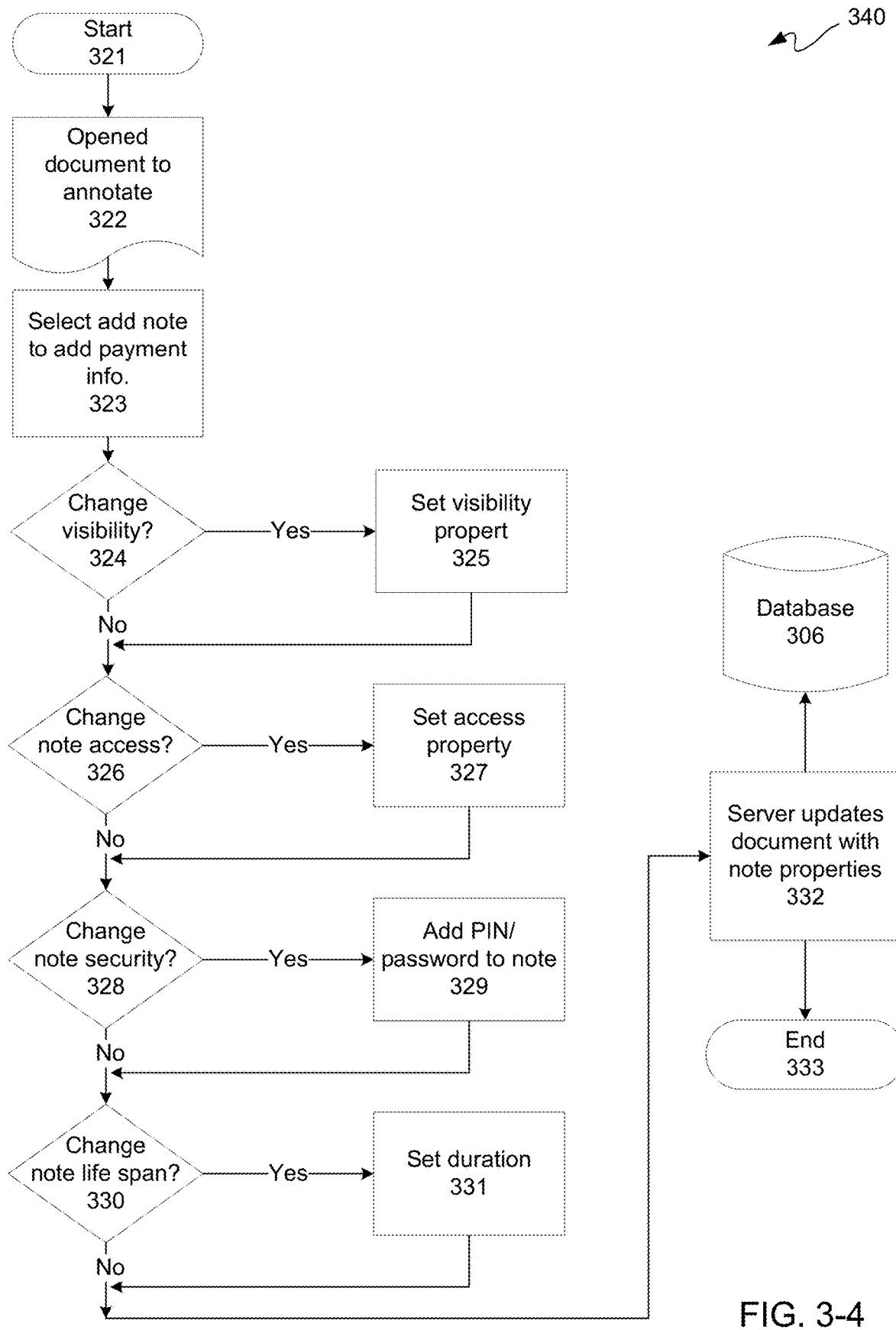

FIG. 3-4 is a flow diagram depicting an example of a note properties flow 340. Note properties flow 340 may be used for setting properties for a note with confidential payment information. Note properties flow 340 is further described with simultaneous reference to FIGS. 1 through 3-4.

At operation 321, note properties flow 340 may start. A user may open a reimbursement document to annotate at operation 322. Such reimbursement document 322 may be sent by a programmed reimbursement document server without having any annotation or note with confidential information. However, such reimbursement document 322 sent to a user and may indicate confidential information has been submitted though not is available in such reimbursement document sent.

At operation 323, a user may select an add note operation to add confidential payment information submitted to a reimbursement document 322 by way of association, such as via linkage. Effectively, a user may a selected note in a database to associated with an opened reimbursement document 322 without revealing such confidential information.

At operation 324, a change of visibility prompt may be provided to a user. If a user elects to change a visibility property of a note, then such visibility property may be set at operation 325.

An owner can assign who can view a sticky note. Visibility options may include: individual users; a group of users, public (all users); or private (only owner). In a document server, an unauthorized user may see a number of annotations in a document and may request view access to from an owner.

If a user chooses not to change a visibility property from a default setting at operation 324, or if a user has completed setting a visibility property at operation 325, then note properties flow 340 may proceed to a next properties setting question starting at operation 326.

At operation 326, a change of note access prompt may be provided to a user. If a user elects to change a note access property of a note, then such note access property may be set at operation 327. If a user chooses not to change a note access property from a default setting at operation 326, or if a user has completed setting a note access property at operation 327, then note properties flow 340 may proceed to a next properties setting question starting at operation 328. For example, an owner can set access to a sticky note. Options for access may include: READ-users can only view a sticky note; WRITE-users can only view/modify a sticky note; or DELETE-users can view/modify/delete a sticky note.

At operation 328, a change of note security prompt may be provided to a user. If a user elects to change a note security property of a note, then such note security property may be set, such as a PIN and/or password, at operation 329. If a user chooses not to change a note security property from a default setting at operation 328, or if a user has completed setting a note security property at operation 329, then note properties flow 340 may proceed to a next properties setting question starting at operation 330.

For example, an owner can set a PIN or password to sticky note so only people within a visibility group/users that enter a PIN/password can view such sticky note. PINs and passwords may also include an effective date to limit visibility time frame of a sticky note.

At operation 330, a change of note life span prompt may be provided to a user. If a user elects to change a note life span property of a note, then such note life span property, namely life span duration, may be set at operation 331. Along those lines, a user can specify how long a sticky note is "alive". Options may include: automatic delete by date; automatic delete by state (i.e., delete sticky note when a document is done processing within a workflow).

If a user chooses not to change a note life span property from a default setting at operation 330, or if a user has completed setting a note life span property at operation 331, then note properties flow 340 may proceed to updating properties settings at operation 332.

At operation 332, a programmed reimbursement document server may update properties of a selected annotation or note for storing confidential information. At operation 306, such an updated annotation or note may be stored with such one or more properties in a database. Optionally, a sticky note may be saved in an owner's account so it can be readily reused and added to different documents.

At operation 333, note properties flow 340 may end, while storing at operation 306 may occur in the background.

Figures 3, 4, 5:
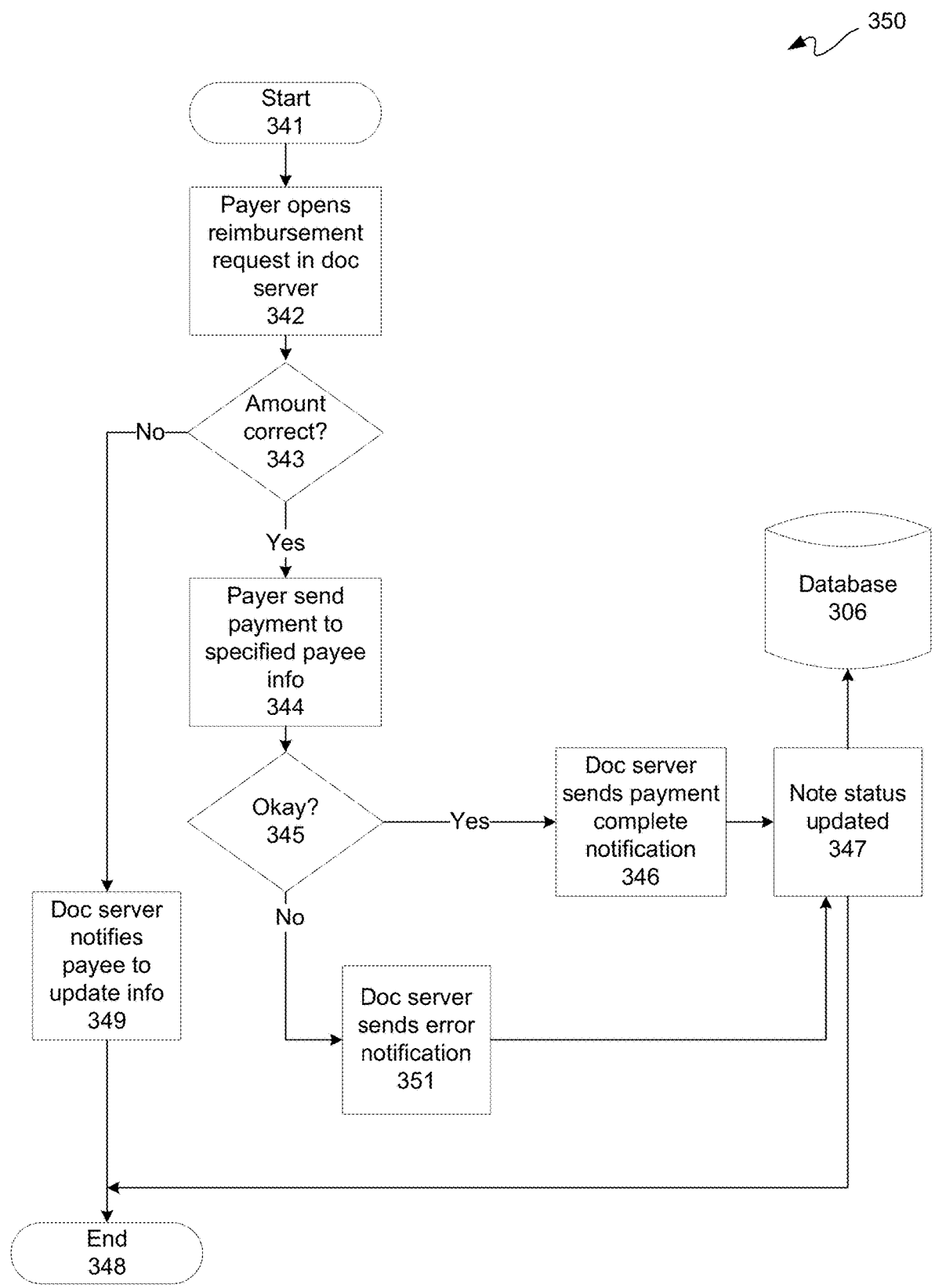

FIG. 3-5 is a flow diagram depicting an example of a payment process flow 350. Payment process flow 350 may be used for payment in response to an uploaded reimbursement document, such as a receipt. Again, such an uploaded receipt may be processed through OCR for upload of such receipt to obtain information therefrom. Payment process flow 350 is further described with simultaneous reference to FIGS. 1 through 3-5.

At operation 341, payment process flow 350 may start, such as with notification of a payer of a payment request. At operation 342, a payer may open an reimbursement request in a document server by logging into such sever, such as via a desktop or mobile app.

At operation 343, it may be determined whether a requested reimbursement amount is correct. For example, payer may view an uploaded receipt with an annotated sticky note containing payment information. A payer may review a total amount of reimbursement requested to determine if it matches that of a receipt. OCR data from a receipt may be compared with a requested reimbursement amount automatically by a programmed document server.

If at operation 343, it is determined such amount is incorrect, then at operation 349 a document server may notify a payee to upload information corresponding to a correct amount. Optionally, a payer may change or update an amount to be reimbursed, and each affected payee may be notified of such change or changes. However, for purposes of clarity by way of example and not limitation, it shall be assumed that a payee is prompted to correct the amount without having an administrator make such change. After such notification at operation 349, payment process flow 350 may end at operation 348.

If, however, at operation 343 a document server determines such amount is correct, then at operation 344 a payer or payor may send a payment to a specified payee obtained from payee information loaded into such document server. Optionally, at operation 345 a payment okay check may be asserted to an admin user.

A payer via a programmed document server may process a payment request and send a specified amount to each payee using payment information in a sticky note. Payment may be done via: an integrated payment service within a programmed document server so a payer may click payment information to load a payment service and populate payment information (e.g., payee ID, amount, etc.). Payment may be performed by accessing and using a payment service mobile app to scan a payee ID if a QR code is used.

If an admin user approves or okays at payment at operation 345, then at operation 346 a document server sends a payment complete notification for recordation in database 306, as well as optionally to a payee to notify same. For updating database 306, at operation 347 status of a note, such as a "sticky note" associated with a receipt is updated to indicate completion, and such updated note may be stored at operation 306 in a database.

If at operation 345 it is determined that payment is not authorized, then at operation 351 a document server may send an error notification for note status update, and optionally to a payee to indicate an error has occurred in a reimbursement request. Such an error notification status may be sent for updating a note at operation 347. Such an updated note may be stored at operation 306 in a database.

Once payment is processing, a sticky note may be updated of current status at operation 347 including errors in case there is incorrect payment information. Payer and payee(s) will be notified of any status change so a user can update information if necessary. Status information (e.g., a processing state, when payment was made and to what amount) may be added to a sticky note at operation 347. In an instance when a user deletes a note or sets to auto-delete a note, status information updated at operation 347 and stored at operation 306 may be extracted and saved in another sticky note (status) so a user or admin can review history.

After updating of status of a note, such as a "sticky note", at operation 347, payment process flow 350 may end at operation 348.

FIG. 3-6 is a flow diagram depicting an example of an unauthorized user permission request flow 360. Unauthorized user permission request flow 360 may be used to allow an unauthorized user to gain access. Unauthorized user permission request flow 360 is further described with simultaneous reference to FIGS. 1 through 3-6.

At operation 351, unauthorized user permission flow 360 may be started. At operation 352, a user may login to a programmed reimbursement document server. At operation 353, it may be determined if an authentic login occurred. If authentication fails, then unauthorized user permission flow 360 ends at operation 358. If, however, a successful login occurs as determined at operation 353, then at operation 354 a reimbursement document with one or more restricted annotations, namely confidential information, may open with such restricted annotations likewise being viewable as annotations in number but without being able to view information in such annotations.

At operation 355, it may be determined whether a request for access beyond just viewing presence of such annotations is made, namely a request to an owner to have view access of restricted information in such annotations. If no request is made for beyond read-only access of plainly viewable without access to restricted information, then unauthorized user permission flow 360 may end at operation 358. If, however, a request for access beyond read-only access is made as determined at operation 355, at operation 356 a request for permission may be sent by a restricted user. At operation 357, a programmed reimbursement document server sends such request to an administrator or owner of such restricted annotations as a confirmation to allow access. Such request may be sent by email with a link to allow access.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 550 for a printer driver and may include a VDP client app 350. However, in another example, a printer driver may be included in drivers 537.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figures 3, 4, 5, 6:
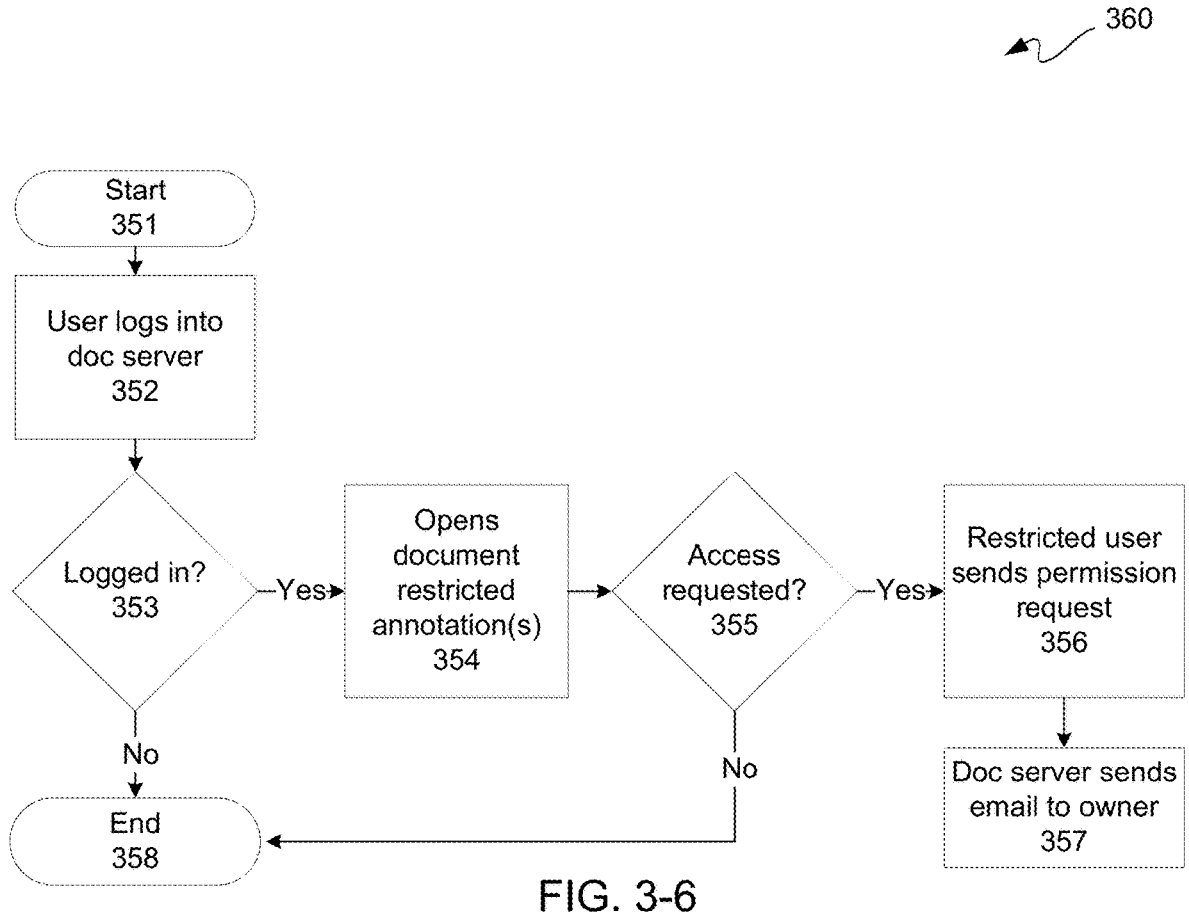
Figure 4:
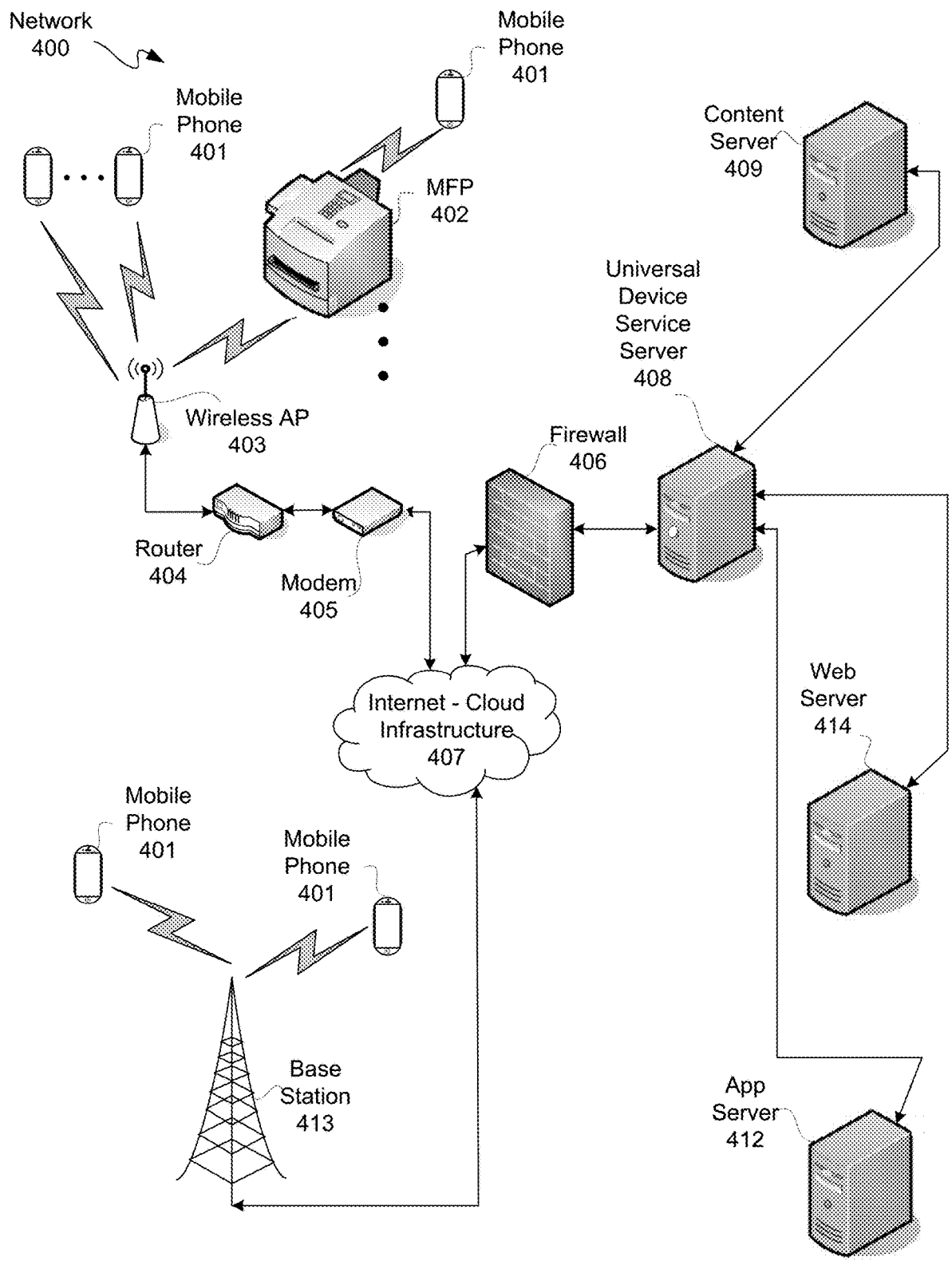
Figure 5:
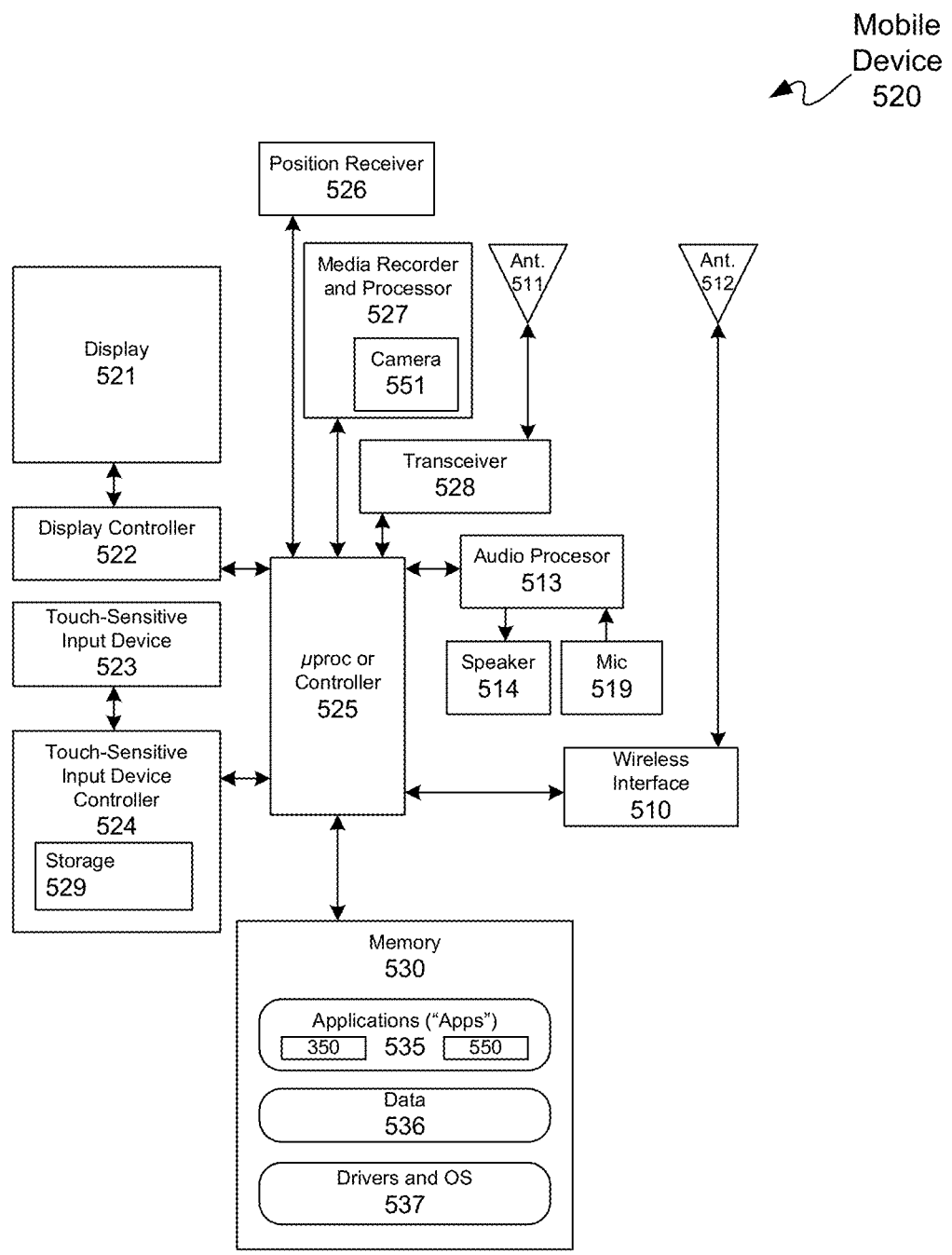
Figure 6:
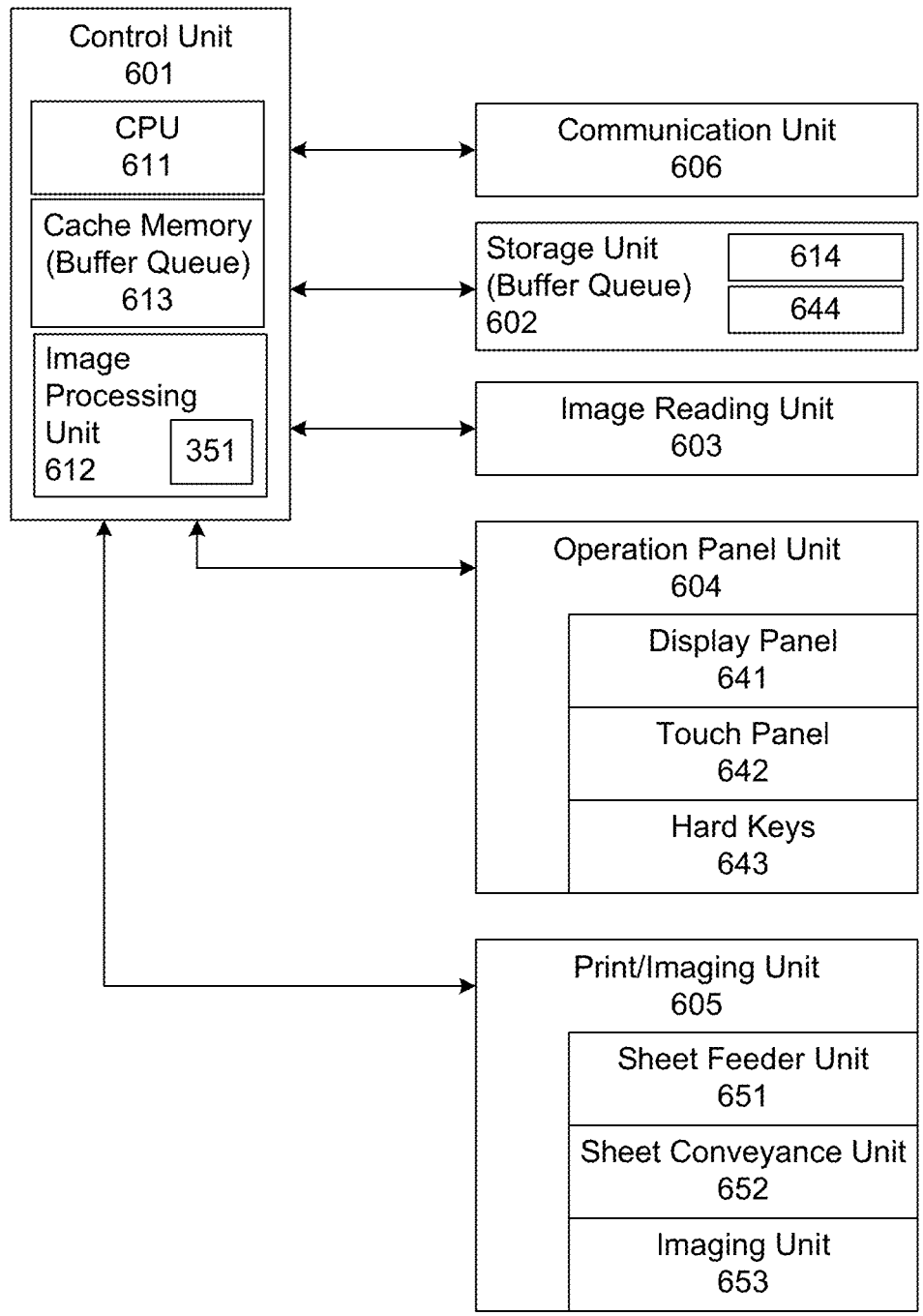

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Image processing unit 612 may be configured with an imposition service 351, as previously described.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
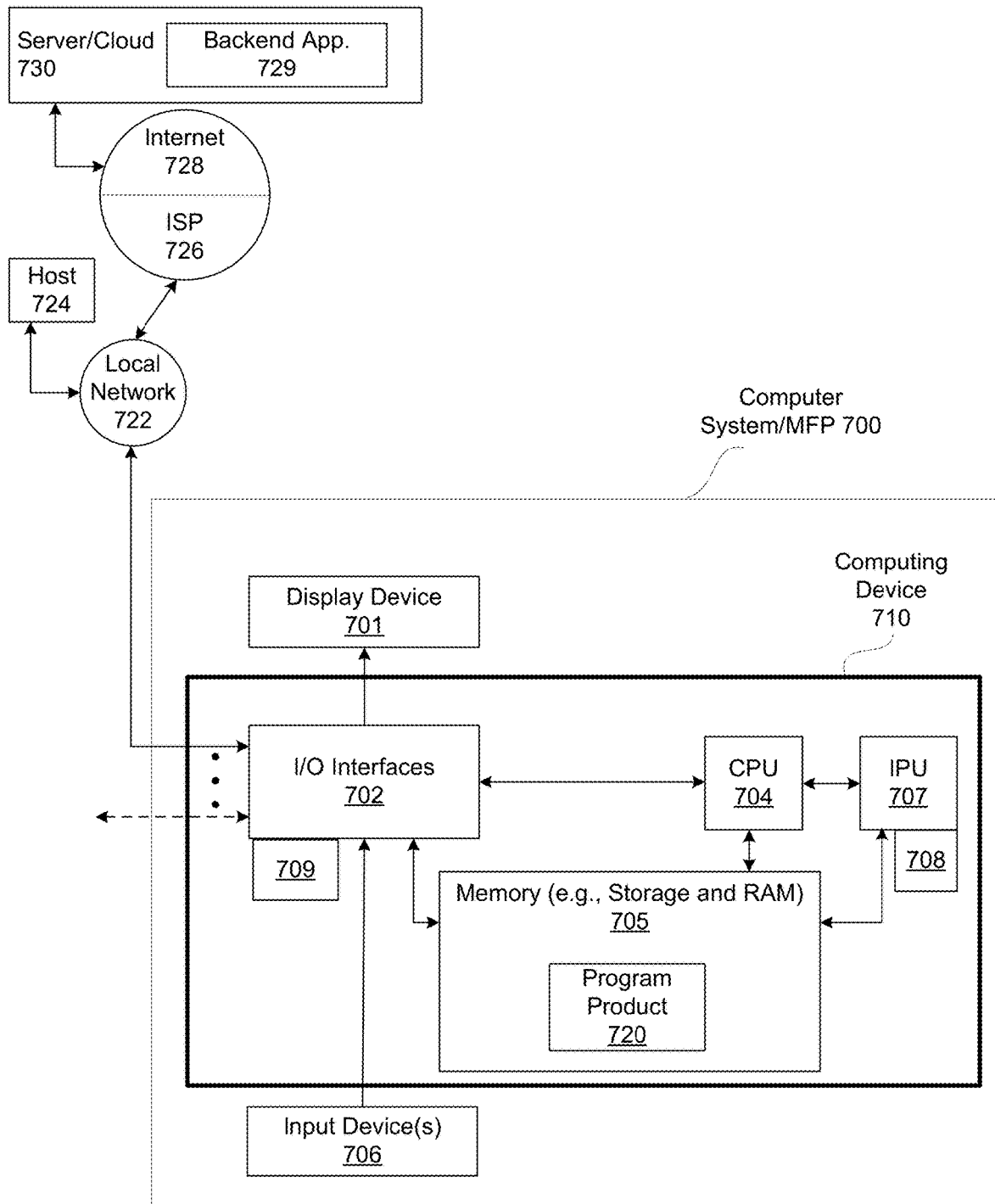
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include an information and document handling manager for a programmed document server. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VOIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for an online financial service, comprising:
    establishing a login session with a programmed server and a mobile device;
    uploading, by the mobile device, an image of a receipt to the programmed server;
    indexing and timestamping the image of the receipt by the programmed server with at least one search tag in association therewith;
    extracting financial information from the image of the receipt with optical character recognition of the programmed server;
    retrieving a note from storage;
    annotating the image of the receipt with the note, the note having payment information for a payment service of the online financial service;
    wherein the annotating causes the authorizing of the programmed server to create a link to the note after retrieval from storage;
    storing the note in association with the image of the receipt though separate from the image of the receipt;
    wherein the link is for application of specific confidential information from one or more specific fields for execution of payment for a reimbursement in association with the image of the receipt; and
    timestamping annotation of the note for having a limited life span separate from a life span of the image of the receipt to provide a temporary association between the note and the image of the receipt for purposes of display but not storage.

2. The method according to claim 1, further comprising batch processing the image of the receipt with other images of receipts for annotating each of the images of the receipts with the at least one annotation.

3. The method according to claim 2, wherein the at least one annotation is stored in an encrypted form.

4. The method according to claim 2, wherein the batch processing comprises searching for the at least one search tag for the annotating of the receipts with the at least one annotation.

5. The method according to claim 2, wherein the batch processing comprises linking multiple ones of the images of the receipts with one annotation of the at least one annotation.

6. The method according to claim 5, wherein the limited life span of the at least one annotation is shorter than the life span of the image of the receipt.

7. The method according to claim 1, further comprising:
    sending the image of the receipt without the at least one annotation from the programmed server;
    wherein the image of the receipt sent indicates the payment information has been submitted though not available in the image of the receipt sent.

8. The method according to claim 7, wherein the at least one annotation is stored in a first database separate from a second database for storing the image of the receipt.

9. The method according to claim 8, wherein the first database is configured for a general data protection regulation.

10. The method according to claim 1, further comprising printing the image of the receipt.

11. A system, comprising:
    a host computational device having:
        a memory configured to store program code; and
        a processor coupled to the memory;
    wherein, in combination and response to executing the program code, the host computational device is configured to initiate operations for implementing a process for an online financial service, the process including:
        establishing a login session by a mobile device with the host computational device as a programmed server having the processor and the memory;
        uploading, by the mobile device, an image of a receipt to the programmed server;
        indexing and timestamping the image of the receipt by the programmed server with at least one search tag in association therewith;

extracting financial information from the image of the receipt with optical character recognition of the programmed server;

retrieving a note from storage;

annotating the image of the receipt with the note, the note having payment information for a payment service of the online financial service;

wherein the annotating causes the authorizing of the programmed server to create a link to the note after retrieval from storage;

storing the note in association with the image of the receipt though separate from the image of the receipt;

wherein the link is for application of specific confidential information from one or more specific fields for execution of payment for a reimbursement in association with the image of the receipt; and timestamping annotation of the note for having a limited life span separate from a life span of the image of the receipt to provide a temporary association between the note and the image of the receipt for purposes of display but not storage.

12. The system according to claim 11, wherein the at least one annotation is timestamped for having a limited life span separate from a life span of the image of the receipt.

13. The system according to claim 12, wherein the process further includes batch processing the image of the receipt with other images of receipts for annotating each of the images of the receipts with the at least one annotation.

14. The system according to claim 13, wherein the batch processing comprises searching for the at least one search tag for the annotating of the images of the receipts with the at least one annotation.

15. The system according to claim 13, wherein the batch processing comprises linking multiple ones of the images of the receipts with one annotation of the at least one annotation.

16. The system according to claim 15, wherein the limited life span of the at least one annotation is shorter than the life span of the image of the receipt.

17. The system according to claim 12, wherein the process further includes sending the image of the receipt without the at least one annotation from the programmed server.

18. The system according to claim 17, wherein the image of the receipt sent indicates the payment information has been submitted though not available in the image of the receipt sent.

19. The system according to claim 18, wherein the at least one annotation is stored in a first database separate from a second database for storing the image of the receipt.

20. The system according to claim 19, wherein the first database is configured for a general data protection regulation.

* * * * *